May 6, 1952  H. E. BAKER  2,595,324
POULTRY FEEDER
Filed Aug. 8, 1950  2 SHEETS—SHEET 1

Inventor
Harry E. Baker

By *Clarence A. O'Brien and Harvey B. Jacobson*
Attorneys

May 6, 1952  H. E. BAKER  2,595,324
POULTRY FEEDER
Filed Aug. 8, 1950  2 SHEETS—SHEET 2
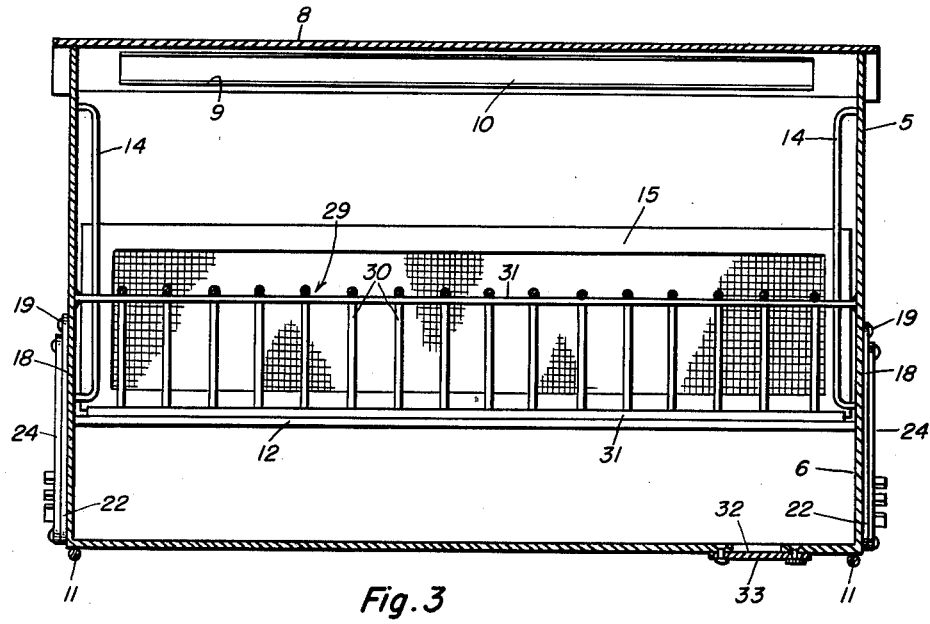
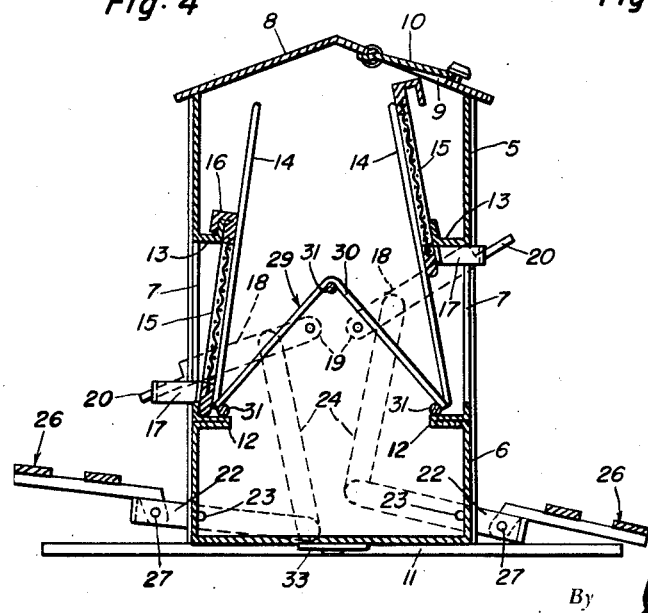
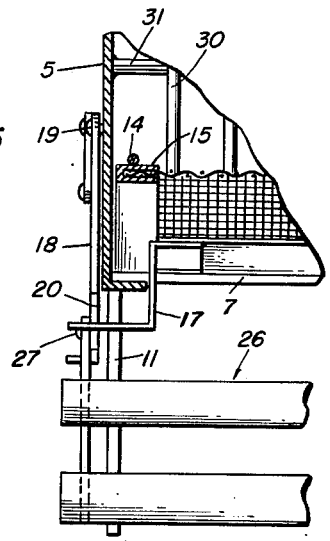
Inventor
Harry E. Baker Patented May 6, 1952

2,595,324

UNITED STATES PATENT OFFICE 2,595,324

POULTRY FEEDER

Harry E. Baker, Macomb, Ill.

Application August 8, 1950, Serial No. 178,328

5 Claims. (Cl. 119—55)

This invention relates to an improved poultry feeder of the type disclosed in my U. S. application, Serial No. 772,430, filed Sept. 5, 1947, now Patent No. 2,552,660, wherein access to feed in the lower portion of a housing is had through openings in the sides of the latter, and wherein said openings are normally closed by sliding doors which lower by gravity to closed position and are raised by the fowls to open position through the medium of treadle or perch operated means.

An object of the present invention is to provide a simple and efficient perch-operated means to raise the doors to open position.

Another object is to provide means whereby the doors are securely closed when lowered.

Other objects and features of the invention will be apparent from the following description when considered with the accompanying drawings, in which:

Figure 3 is a vertical longitudinal section taken on the line 3—3 of Figure 2;

Figure 4 is a vertical transverse section taken on the line 4—4 of Figure 1;

Figure 5 is an enlarged fragmentary horizontal section taken on the line 5—5 of Figure 1.

Figure 1:
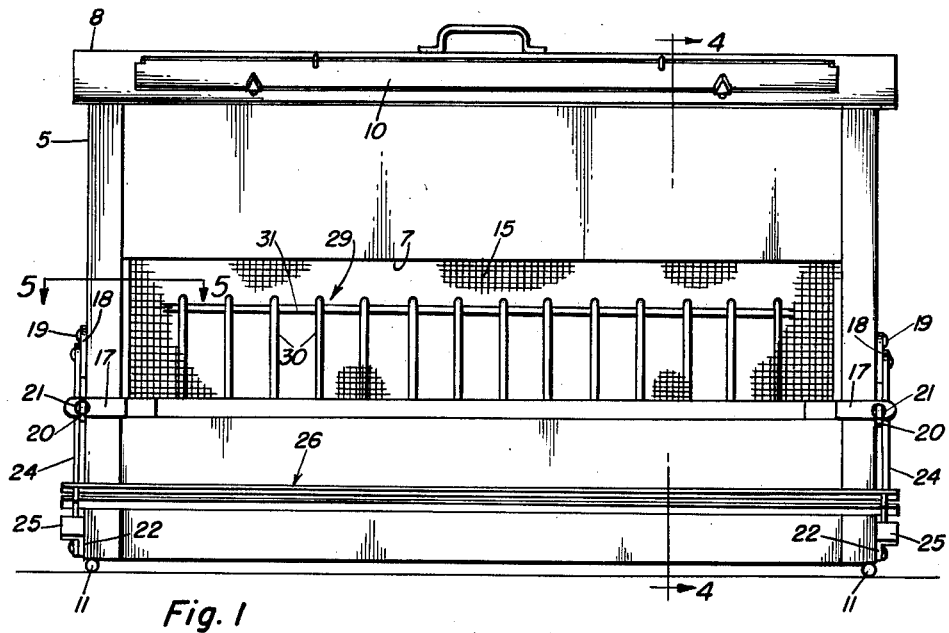
Figure 1 is a side elevational view of a poultry feeder constructed in accordance with the present invention.
Figure 2:
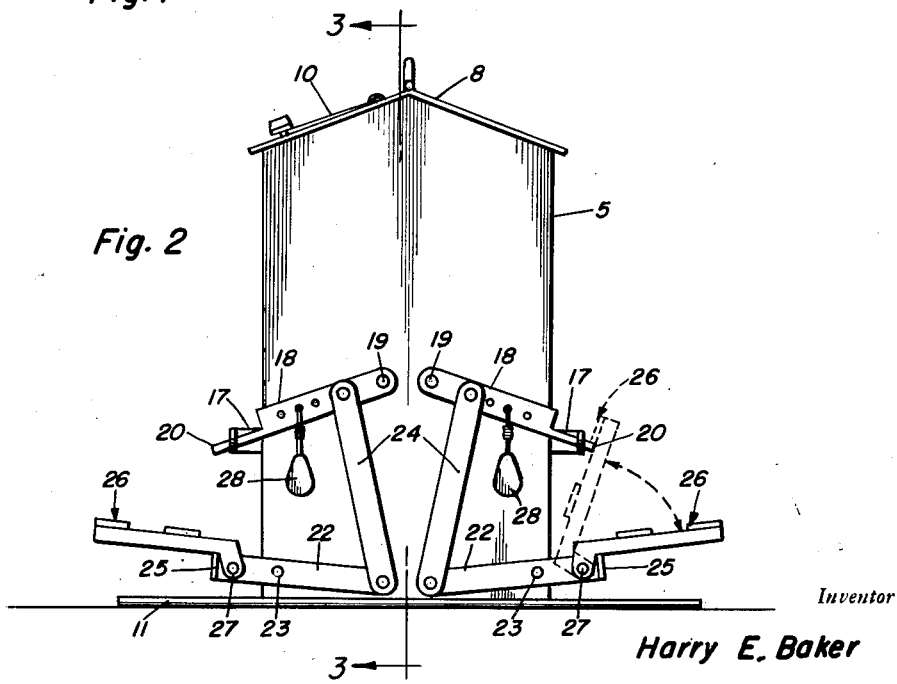
Figure 2 is an end elevational view thereof.

Referring in detail to the drawings, 5 indicates a horizontally elongated housing whose lower portion 6 forms a feed trough, and which has feeding openings 7 in the opposite sides thereof which extend substantially from end to end of said housing. The housing has a gable roof 8 provided with an opening 9 closed by a hinged door 10 and through which feed may be supplied to the lower portion of the housing. Runners 11 are fixed to the bottom of the housing at the ends thereof, and these runners project beyond opposite sides of the housing to prevent the latter from being overturned sidewise. Along the bottoms of the openings 7, the sides of the housing are provided with inwardly projecting horizontal flanges 12, and along the tops of said openings, said sides of the housing are provided with inwardly projecting horizontal angular flanges 13 whose inner portions extend upwardly. Outwardly inclined guide rods 14 are disposed within and fixed to the ends of the housing so as to extend from the ends of flanges 12 upwardly above the ends of the flanges 13 adjacent but spaced inwardly of the latter. Screen doors 15 for the openings 7 are slidable between the flanges 13 and the guide rods 14 so as to lower upon flanges 12 by gravity to closed position and to be raised to open position. The frames of the doors 15 have angular flanges 16 at the top adapted to hook over the flanges 13 when said doors are closed to prevent the doors from being forced or flexed inwardly away from said flanges by rodents or the like attempting to gain access to the feed within the housing. Angular arms 17 are fixed to the ends of the doors 15 at the bottoms of the latter so as to project forwardly through the openings 7 and then laterally beyond the ends of the housing. Vertically swingable levers 18 are pivoted at their inner ends to the outer sides of the ends of the housing as at 19, and these levers have rigid pins 20 at their outer ends which loosely and slidably project through openings 21 of the arms 17, whereby upward movement of said levers will cause raising of the doors to open position and downward movement thereof will cause lowering of the doors to closed position. Other levers 22 are pivoted at 23 intermediate their ends to the ends of the housing at points below the levers 18 and near the bottom and sides of the housing. Links 24 connect the intermediate portions of levers 18 with the inner ends of the levers 22, and the outer ends of levers 22 project outwardly beyond the sides of the housing and have lateral terminal portions 25. Perches 26 are hinged at 27 to the outer ends of levers 22 so as to fold upwardly and inwardly adjacent the sides of the housing when the feeder is not in use. The terminal portions 25 limit outward and downward swinging of the perches to operative positions substantially coextensive with the levers 22. The perches are folded inwardly and suitably secured in folded position to facilitate storage or transportation of the feeder. Weights 28 are carried by and adjustable longitudinally of the levers 18. The arrangement is such that when a fowl lands on either perch, its weight will depress such perch and swing the associated levers 22 so as to raise to open position the door 15 operatively connected thereto by links 24, levers 18 and arms 17. Also, each weight 28 is such and so adjusted that a rodent or other animal of lesser weight than an average fowl of given age will not open the door connected to either perch should such animal mount the latter.

In order to prevent a fowl from entering the housing and contaminating the feed, a guard 29 of inverted V-shape is mounted within the housing between the openings 7 and upon the flanges 12, and extends from end to end of said housing. This guard preferably consists of transverse parallel bars 30 of inverted V-shape spaced apart a distance to just admit the head of a fowl therebetween and connected at and intermediate their ends by longitudinal horizontal rods 31 which may be soldered or otherwise fixed to the flanges 12 and the ends of the housing.

The feeder is simple and durable in construction, and has been found to operate efficiently in use. If desired, the housing may have a bottom clean-out opening 32 provided with a pivoted closure plate 33.

What is claimed as new is:

1. In a poultry feeder, a housing including side walls, end walls, a bottom and a top, said housing having a feeding opening above the bottom and in one side wall thereof, said housing being provided along the bottom of said opening with an inwardly projecting horizontal flange and along the top of said opening with an inwardly projecting angular flange having an upwardly extending inner portion, guide rods arranged within and fixed to the end walls of said housing and extending upwardly from the first named flange above the angular flange past and in inwardly spaced relation to the latter, a sliding screen door for said opening movable between said angular flange and said guide rods between a lowered closed position resting on said horizontal flange and a raised open position, said door having an angular flange at the top adapted to hook over the angular flange of the housing when the door is lowered to closed position.

2. In a poultry feeder, a housing including side walls, end walls, a bottom and a top, said housing having a feeding opening in one side wall thereof above the bottom of the same, guide rods arranged within and fixed to the end walls of the housing adjacent and inwardly of said opening, a sliding screen door for said opening within the housing, said door having its ends engaged with the outer sides of said guide rods and movable along the latter between a lowered closed position and a raised open position, angular arms fixed to the ends of said door adjacent the bottom thereof and projecting outwardly through said opening and then laterally beyond the end walls of the housing, levers pivoted at their inner ends to the end walls of and disposed outside the housing, rigid pins on the outer ends of the levers loosely and slidably projecting through said arms, other levers pivoted between their ends to the end walls of the housing adjacent said side wall and the bottom of the same below the first-named levers, the outer ends of the second named levers projecting beyond said side wall of the housing, links connecting intermediate portions of the first-named levers with the inner ends of the second named levers, and a perch carried by the outer ends of the second-named levers.

3. In a poultry feeder, a housing including side walls, end walls, a bottom and a top, said housing having a feeding opening in one side wall thereof above the bottom of the same, guide rods arranged within and fixed to the end walls of the housing adjacent and inwardly of said opening, a sliding screen door for said opening within the housing, said door having its ends engaged with the outer sides of said guide rods and movable along the latter between a lowered closed position and a raised open position, angular arms fixed to the ends of said door adjacent the bottom thereof and projecting outwardly through said opening and then laterally beyond the end walls of the housing, levers pivoted at their inner ends to the end walls of and disposed outside the housing, rigid pins on the outer ends of the levers loosely and slidably projecting through said arms, other levers pivoted between their ends to the end walls of the housing adjacent said side wall and the bottom of the same below the first-named levers, the outer ends of the second named levers projecting beyond said side wall of the housing, links connecting intermediate portions of the first-named levers with the inner ends of the second named levers, and a perch hinged to the outer ends of the second-named levers to fold upwardly and inwardly toward said side of the housing.

4. In a poultry feeder, a housing including side walls, end walls, a bottom and a top, said housing having a feeding opening in one side wall thereof above the bottom of the same, guide rods arranged within and fixed to the end walls of the housing adjacent and inwardly of said opening, a sliding screen door for said opening within the housing, said door having its ends engaged with the outer sides of said rods and movable along the latter between a lowered closed position and a raised open position, angular arms fixed to the ends of said door adjacent the bottom thereof and projecting outwardly through said opening and then laterally beyond the end walls of the housing, levers pivoted at their inner ends to the end walls of and disposed outside the housing, rigid pins on the outer ends of the levers loosely and slidably projecting through said arms, other levers pivoted between their ends to the end walls of the housing adjacent said side wall and the bottom of the same below the first-named levers, the outer ends of the second-named levers projecting beyond said side wall of the housing, links connecting intermediate portions of the first-named levers with the inner ends of the second-named levers, a perch carried by the outer ends of the second-named levers, and weights carried by and adjustable longitudinally of the first-named levers.

5. In a poultry feeder, a housing including side walls, end walls, a bottom and a top, said housing having a feed supply opening in the top thereof, a door hinged to the housing for closing said opening, said housing further having a feeding opening in one side wall thereof and above the bottom of the same, and being provided along the bottom of said feeding opening with an inwardly projecting flange, and a guard fixed in the housing inwardly of said feeding opening, said guard including spaced parallel transverse rod members inclined toward said flange and spaced apart a distance just sufficient for the passage of the head of a fowl therebetween, and longitudinal rods connecting the ends of said transverse rod members and fixed to said flange and the end walls of the housing.

HARRY E. BAKER.

REFERENCES CITED

The following references are of record in the file of this patent:

UNITED STATES PATENTS

| Number | Name | Date |
|---|---|---|
| 2,386,010 | Spivey | Oct. 2, 1945 |
| 2,534,608 | Lasater | Dec. 19, 1950 |
| 2,552,660 | Baker | May 15, 1951 |